United States Patent [19]

Reynolds

[11] 4,144,870
[45] Mar. 20, 1979

[54] ADJUSTABLE BROILER CONVECTION OVEN

[76] Inventor: Howard R. Reynolds, 1551 21st St., Manhattan Beach, Calif. 90266

[21] Appl. No.: 749,316

[22] Filed: Dec. 10, 1976

[51] Int. Cl.² .............................................. F24C 3/08
[52] U.S. Cl. ................................. 126/41 E; 99/391; 99/393
[58] Field of Search ............... 126/41 R, 41 E, 41 D, 126/340; 99/390, 391, 393

[56] References Cited

U.S. PATENT DOCUMENTS

| 2,283,853 | 5/1942 | Frick | 126/41 E |
| 2,331,707 | 10/1943 | Lotter | 126/41 E |
| 2,868,190 | 1/1959 | Reeves | 126/41 E |
| 2,880,716 | 4/1959 | Brodbeck | 126/41 D |

Primary Examiner—Edward G. Favors
Attorney, Agent, or Firm—William H. Maxwell

[57] ABSTRACT

A convection flow broiler of open front configuration having an elevator-drawer carrying a food supporting and contacting griddle controllably dipped from horizontal for continuous drainage of greases therefrom, and having fixedly positioned radiant top heat to which the griddle is adjustably positioned, and having bottom heat carried with the said griddle in fixed relation thereto.

6 Claims, 10 Drawing Figures

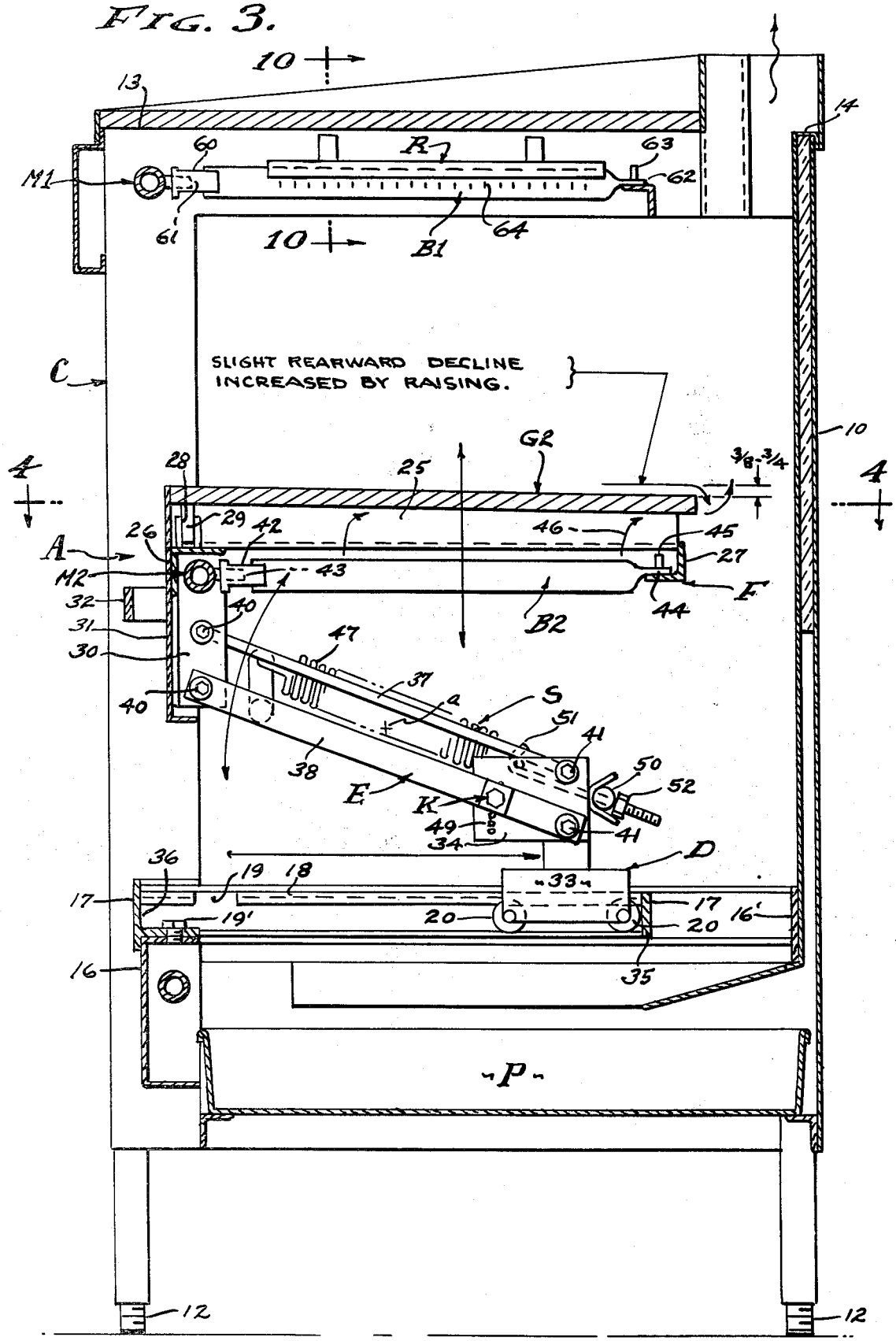

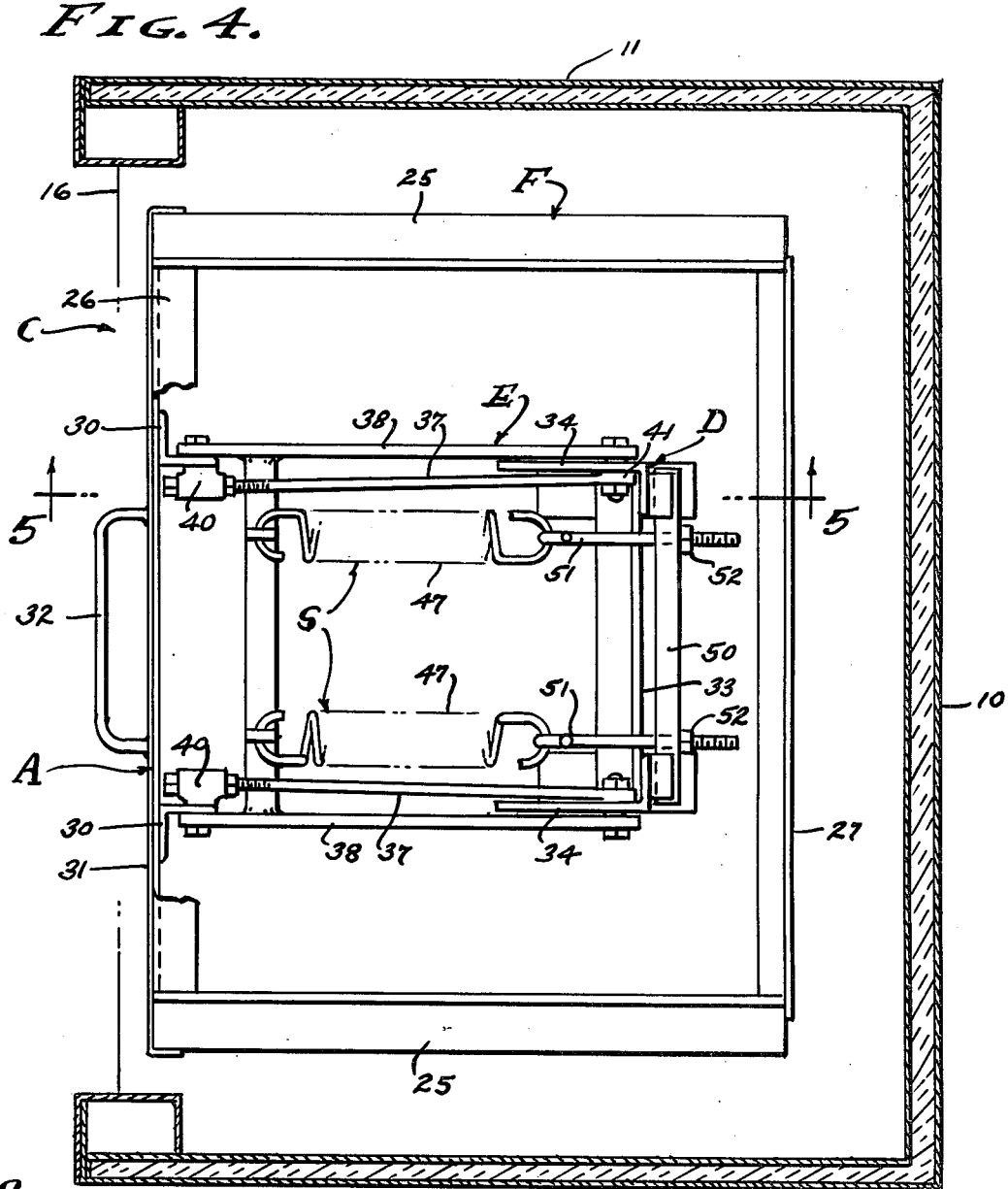
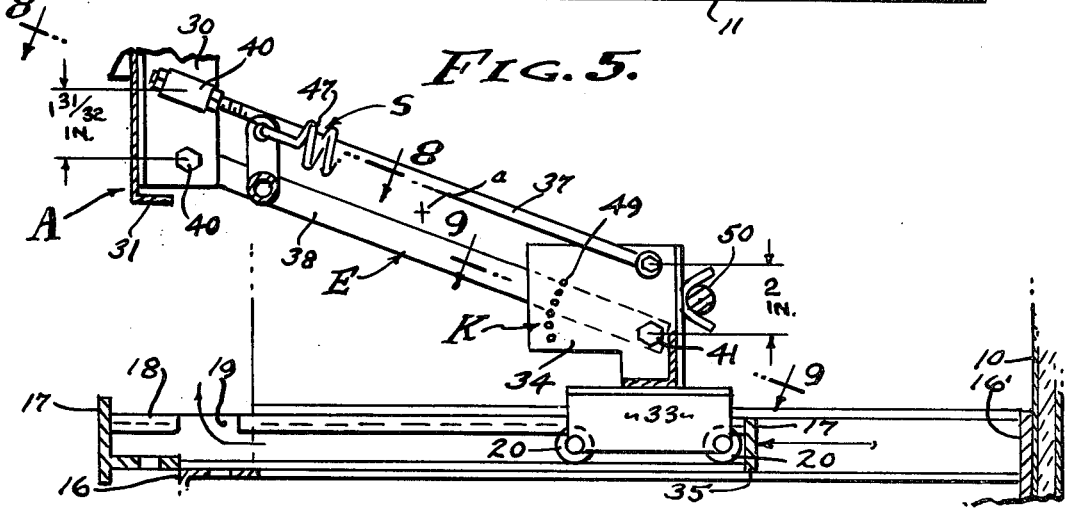

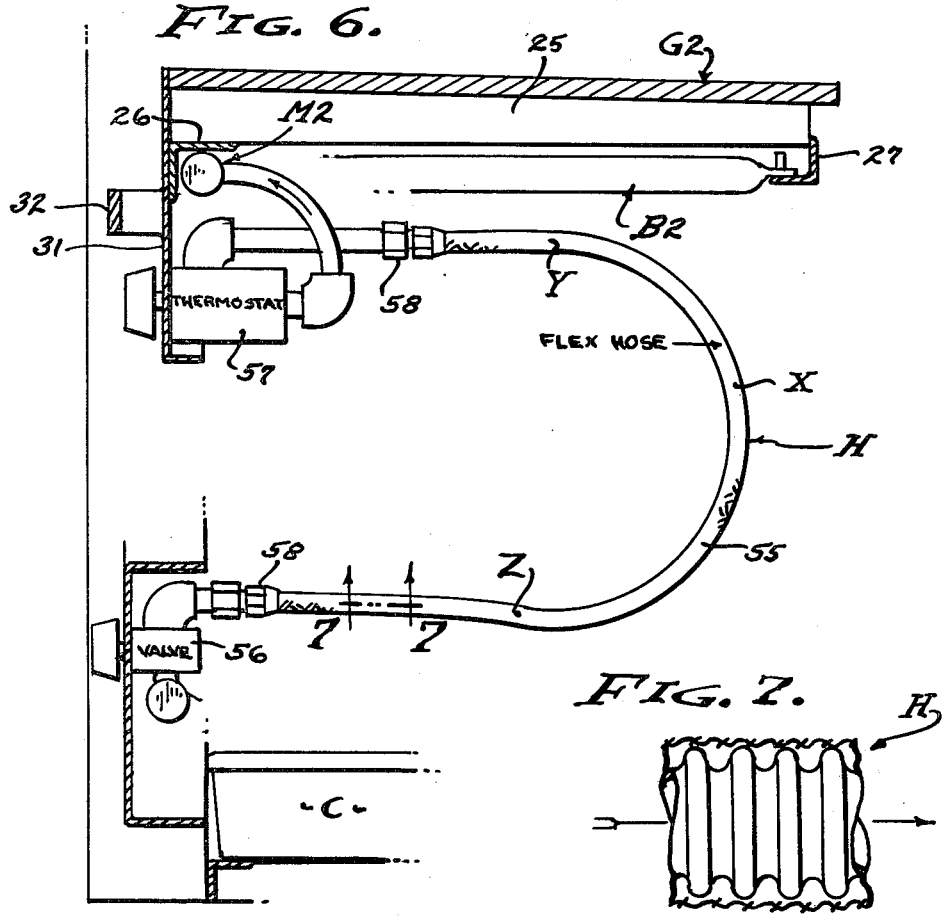
FIG. 6.
FIG. 7.
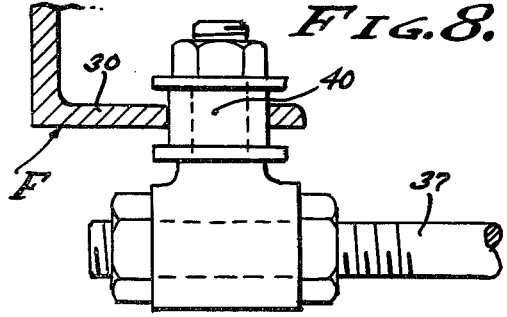
FIG. 8.
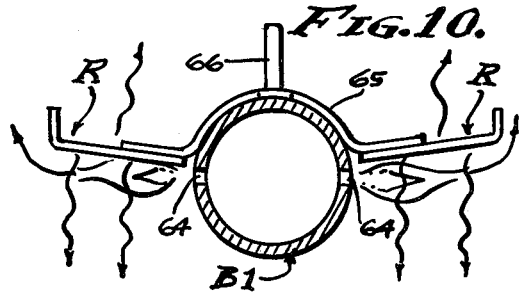
FIG. 10.
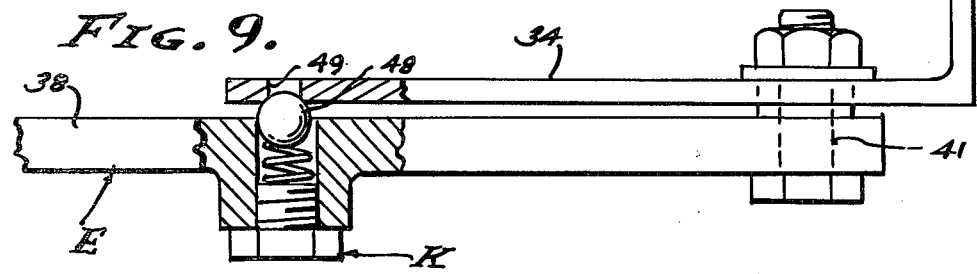
FIG. 9.

ADJUSTABLE BROILER CONVECTION OVEN

BACKGROUND

This invention relates to stoves used commercially for broiling meats and foods that require the application of heat from both above and below. That is, meats and foods that are to be broiled both top and bottom. Heretofore, top broilers have been used and the meats or foods turned over for heat application to both sides. Also, fry plates have been used where the meats or foods lie in grease or oil, while broiler heat is applied from above. Stove broilers are usually referred to as ovens into which moveable grills support the meats or foods, with top and/or bottom heating elements, and with vertical adjustment of the said grills. Characteristically, the meat or food supporting element of the broiler under consideration is a plate or griddle which is heated from beneath and which is positionable in spaced relation to radiant heat from above. A feature of the cooking method involved is that the meats or foods are not turned, and that cooking time is minimized with low temperature application from both below and above. The meats and foods do not steep in their own grease or oils, the plate or griddle being disposed to drain off while the meats or foods are simultaneously broiled from both top and bottom sides. It is a general object of this invention, therefore, to provide a stove for low temperature broiling while disposing of fats rendered from the foods being cooked, a method of cooking which is most healty in every respect, without charing and with the elimination of grease during the cooking process.

Stove broilers of the type under consideration must be versatile in their capability to cook (1) meats such as steaks, chops, fish and hamburger; (2) ham and toast; (3) bacon, eggs, omelettes, sausage and breakfast rolls; (4) grilled cheese sandwiches, french toast, pizza, lobster, spanish dishes; and (5) chicken, biscuits and baked potatoes. The foregoing foods are listed according to their relative proximity requirements to the radiant top heat and comparable applied bottom heat. Generally, meats except chicken are positioned close to the top heat and comparable bottom heat applied, and when not using top heat it is desirable to lower and remove the food from said top heat. With the present invention, the top heat is fixedly positioned, while the bottom heat moves with the positionable food supporting plate or griddle. In practice, the plate or griddle is carried by an elevator-drawer to be raised and lowered and removable sufficiently from the oven chamber for loading and/or for cooking without top heat. It is an object to provide elevating means to facilitate positioning of the plate or griddle with respect to its proximity to the top heat; it is another object to provide drawer means to facilitate withdrawal and insertion of the plate or griddle from and into the oven chamber; and it is also an object to provide bottom heat moving with the plate or griddle per se to uniformly heat the same. The energy source for heating can be electrical or gas and preferably the latter as will be described, And, the positioning of the plate or griddle provides exposure for loading and unloading, there being means to compensate for the weight of food applied so as to maintain a selected position with assurance.

Heretofore the heat sources of stoves and broilers have been fixed or static, not dynamic, it being an object of this invention to provide for movability of a heat source and particularly the bottom heat source.

Heat sources for boiling have relied upon the heat radiating capability of the heating element or burner per se, and in some instances upon radiant devices applied thereto such as ceramic radiants applied to gas flames. The said ceramic radiants are heavy and cumbersome, as well as fragile; it being an object of this invention to provide a more efficient space saving radiant that is durable. With the present invention, metalic radiant elements of low mass are disposed in close proximity to the direction of the gas flame for efficient heat absorption and radiation.

Low heat cooking is an object of this invention, with gas burner efficiency of prime concern. The oven chamber is open with the draft upward and inherently beneath the top plate or griddle and toward a rear vent. Characteristically therefore, there are upper and lower griddles, a warmer plate or griddle and a broiler plate or griddle. The former is stationary and heated by the radiants of and by the top burners, and the latter is dynamic and adapted to be movably positioned as circumstances require. The top griddle is for maintaining the heated condition of foods and for warming, while the lower griddle is primarily for the cooking process.

SUMMARY OF INVENTION

The stove is shown in its preferred form as a front opening cabinet C adapted to be leveled in a free standing position spaced a safe distance from building structure walls. The sides and back of the cabinet C are insulated, the front is open, and the bottom comprised of a drip pan P. There are upper and lower griddles G1 and G2, the former griddle G1 fixed and substantially coextensive with the top of the cabinet C, and the latter griddle G2 movable into elevated positions within the cabinet oven chamber. In accordance with this invention, there is an elevator-drawer A that carries the griddle G2, compensating for the weight of the foods supported thereby and movably carrying bottom burners B2 in uniformly close proximity beneath the lower griddle G2. Both the top and bottom burners B1 and B2 are fixedly postioned in uniformly close proximity beneath their respective griddles G1 and G2, there being a flexible gas connector means H supplying the lowermost movable burners B2. A feature is the radiants R of the top burners B1 which overlie the horizontal flame jets thereof to efficiently absorb heat for downward radiation onto the food to be broiled thereby. Simultaneously, the food supporting lower griddle G2 applies bottom heat to the food load without frying as will be described.

DRAWINGS

The various objects and features of this invention will be fully understood from the following detailed description of the typical preferred form and application thereof, throughout which description reference is made to the accompanying drawings, in which:

FIG. 3 is an enlarged sectional view taken substantially as indicated by line 3—3 on FIG. 2 showing the elevator means in elevation.

FIG. 4 is a plan section taken as indicated by line 4—4 on FIG. 3.

FIG. 5 is a fragmentary view of the elevator means in section.

FIG. 6 is an elevational section showing the connector means and taken substantially as indicated by line 6—6 on FIG. 2.

FIG. 7 is an enlarged fragmentary section taken as indicated by line 7—7 on FIG. 6.

Figure 1:
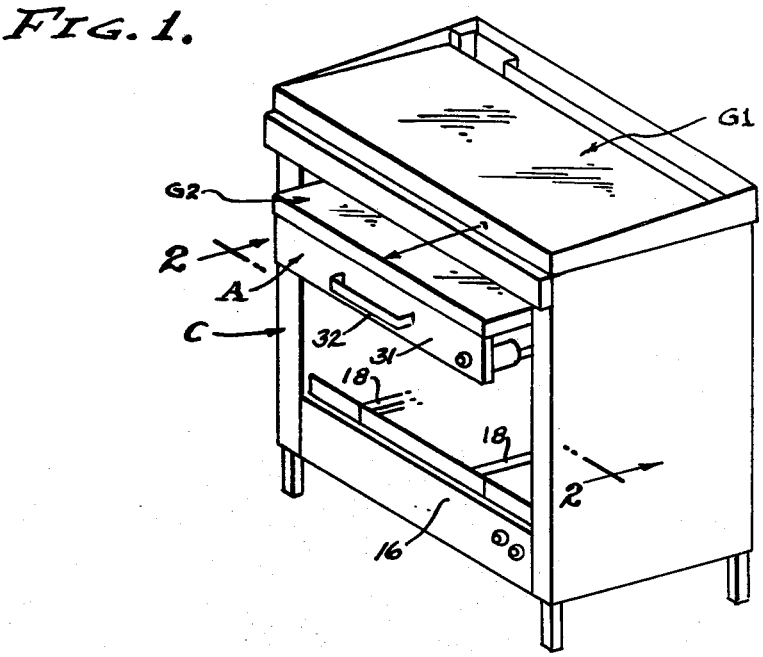
FIG. 1 is a perspective view of the adjustable broiler convection oven.
Figure 2:
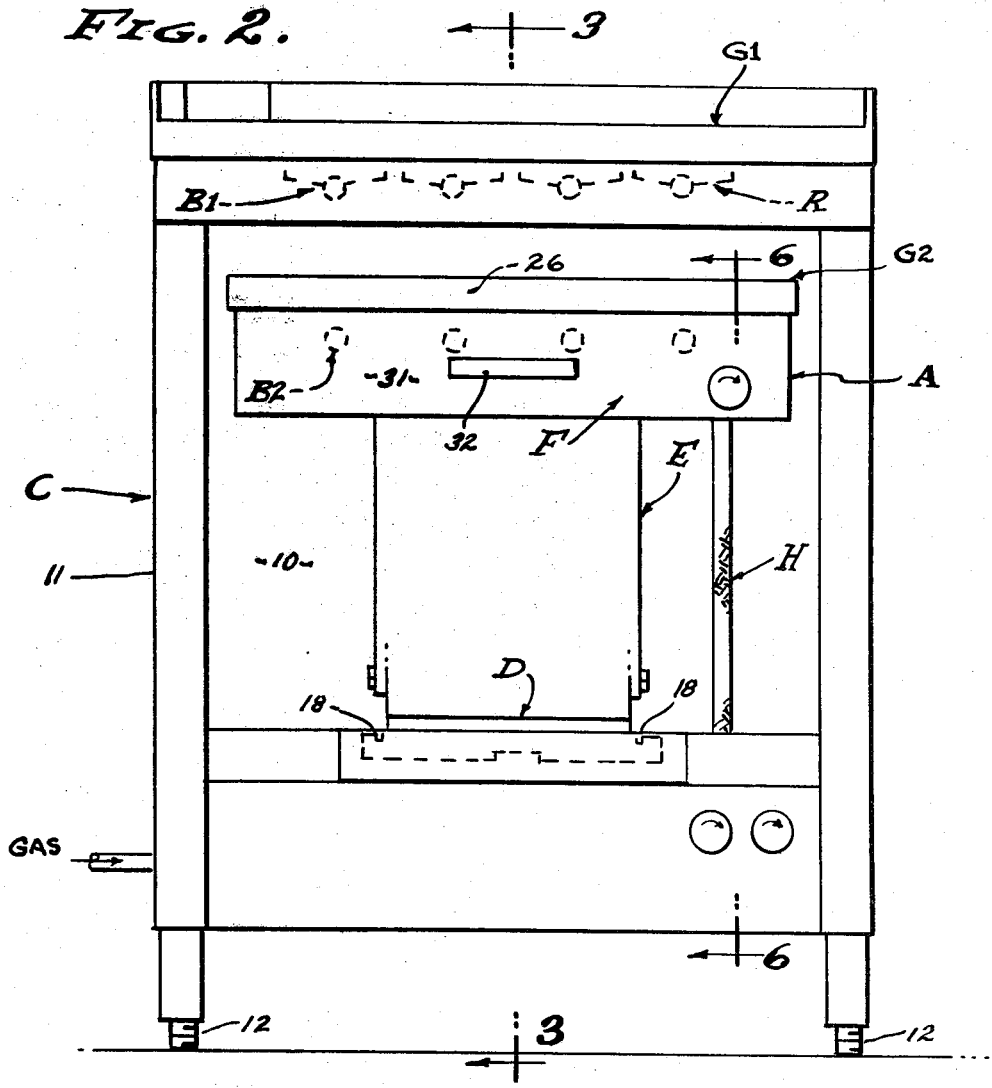
FIG. 2 is an enlarged front view taken as indicated by line 2—2 on FIG. 1.

FIGS. 8 and 9 are enlarged detailed sectional views taken as indicated by lines 8—8 and 9—9 on FIG. 5 and FIG. 10 is an enlarged detailed sectional view of the radiant burner and taken as indicated by line 10—10 on FIG. 3.

PREFERRED EMBODIMENT

The adjustable broiler is incorporated in the front opening cabinet C comprised of a back panel 10 and parallel side panels 11 provided with front and rear leveling means 12 such as floor engaging screws. The panels 10 and 11 are of double walled sheet metal construction with insulation therebetween, supported above the floor and having coplanar front and back top edges 13 and 14 establishing the front opening oven chamber, and closed at the back by panel 10 and closed at the bottom by the drip pan P. At an intermediate height there are front and rear headers 16 and 16' extending between the side panels 11, and supporting spaced tracks 18 extend from the back to the front opening of the oven chamber. A feature of this invention is the locked-in removability of the elevator-drawer A, a feature which involves a slide that captures rollers 20 operating to carry the said elevator-drawer. As shown, there is a pair of parallel and opposed channel-shaped ways fixedly supported by the headers 16 and 16', within which the spaced tracks 18 are removably carried. The said tracks 18 are integral with and spaced by front and rear headers 17 and 17', the front header serving as a forward stop for the rollers 20 and the rear header serving as a back stop therefor. The top runs of the pair of tracks 18 are notched at 19 and are exposed by withdrawal of the slide to pass the said rollers 20 for upward removal and replacability of the elevator-drawer next to be described. The sliding rails 18 are secured in working position by a fastener 19' that is readily accessible for removal, so as to prevent over extension of the elevator-drawer that would otherwise over flex the connector means H.

The elevator-drawer A functions to be loaded with food and to be positioned with respect to the top heat burners B1, and to carry the bottom heat burners B2. Accordingly, the elevator-drawer A comprises a moveable frame F carried by a carriage D through lift arms E arranged to maintain a near horizontal disposition of said frame and bottom griddle G2 and burners B2 supported thereby. As shown, the frame F is adapted to be positioned vertically with respect to the carriage D, while the elevator-drawer A as a unit is adapted to shift horizontally into and out of the oven chamber. The griddle G2 overlies the frame F while the burners B2 underlie the same, there being a gas manifold M2 carried by the frame in the plane of the burners B2 to supply the same.

The frame F is a rectangular or square member disposed at various levels within the oven chamber, preferably a perimeter frame comprised of spaced and parallel side rails 25 rigidly joined to front and rear cross beams 26 and 27. The top edges of the side rails 25 are coplanar to supportably carry the griddle G2, there being notches 28 to positionably receive lugs 29 depending from the griddle so as to key the same in working position upon the frame. Spaced brackets 30 depend from the front cross beam 26 to carry the manifold M2 and to receive the supporting lift arms E. A decorative shield 31 is carried in front of the frame and equipped with handles 32 for manipulation of elevator-drawer A into positions as required.

The carriage D is supported by the tracks 18 and moves horizontally upon front and rear spaced rollers 20. As shown, the carriage D comprises a truck 33 with spaced mounting plates 34 disposed in parallel vertical planes in alignment with the spaced brackets 30 of the frame F, respectively. The carriage D is relatively short and underlies only the rear of the frame F, and in practice is less than half the length of the tracks 18 along which it moves between rearward and forward positions against stops 35 and 36 that limit its normal travel and for protecting the gas connector means H as will be described. The front stop 36 is removable for complete withdrawal of the elevator-drawer A, for cleaning and for servicing.

The lift arms E operate between the brackets 30 and mounting plates 34, there being upper and lower arms 37 and 38 extending forwardly and upwardly from the said mounting plates to the said frame brackets. In accordance with this invention, the griddle G2 is dipped or pitched laterally and/or rearwardly so as to drain off grease and fats and thereby provide contact broiling as distinguished from frying. In carrying out this invention, there is a permanent lateral dip or pitch to one side of the griddle G2, for example one side of a griddle two foot square is lowered ⅝ to ¾ inch as by means of the different length of spaced brackets 30, as indicated. A feature that controls rearward dip or pitch is the trapezoid and more precisely trapezium configuration of the arms and their vertically spaced mounting and support pivots 40 and 41 which are more closely spaced at the brackets 30 than they are at the mounting plates 34. As a result, the quadrilateral configuration which appears to be a parallegram has no two sides parallel (except perhaps in one position) and for the purpose of increasing the rearward dip or pitch and drainage capability of the griddle G2 the higher it is raised. Furthermore, initial drainage is established by length adjustment of the upper arms 37 as circumstances require. In carrying out this invention, the arms are nominally thirteen inches in length, the rear pivots 41 are vertically spaced two inches on center, while the front pivots 40 are vertically spaced one and thirty one thirty-seconds of an inch on center. Accordingly, the griddle G2 has a "twist" disposition, draining to one side and controllably to the rear of the oven chamber for the discharge of grease and fats into the drip pan P. Thus, it will become apparent that the trapezium and controlled rearward dip is unobvious, while extremely effective in the elimination of fats rendered in the cooking process, whereby frying is eliminated and replaced by bottom griddle broiling.

The griddle G2 is a flat plate of substantial weight rested by gravity upon the rails 25 above the plane of the bottom burners B2 and the griddle G2 can have a ribbed surface (not shown) for searing meats with marks that simulate char boiling. In practice, there is a plurality of parallel burners B2 extending fore and aft and normal to the manifold M2 carried transversely of the frame F by the front beam brackets 30. It is a feature of this invention that the manifold M2 and burners B2 move with the frame F, the said burners being supported by said manifold and rear beam 27 respectively. As shown, the burners B2 are each of tube form having an air shutter 42 supported over a nipple 43 projecting from the manifold, and a flange 44 engaged over a pin 45 assuring an erect positioning of the gas jets 46.

The dynamic weight of the elevator-drawer A hereinabove described is balanced by a compensator means S comprised of a tension spring 47 pulling in a controllably shifting alignment disposed substantially above the center of effort a of the aforesaid trapezium configuration of the lift arms. Accordingly, the live ends of a pair of tension springs 47 are coupled to the trapezium at the top arm 37 or the bracket 30, and the anchored ends thereof are secured between the pivots 40 and 41 at the mounting plate 34. The anchor mounting is by means of a transverse bar 50 journaled in saddles at the opposite mounting plates and through which screw hooks 51 are adjustably positioned by nuts 52. A feature of the said compensator means is the reciprocal increase and decrease in mechanical advantage at opposite ends of the springs 47; for example as the frame F is raised the leverage is reduced at the bracket end of the arms while it is increased at the mounting plate end of the arms; and reversely as the frame F is lowered the leverage is increased at the bracket end of the arm while it is decreased at the mounting end of the arm. Consequently, the lifting action is nominally the same regardless of elevation; and to the end that a detent positioning means K is effective to maintain a selected position. As shown, the lower arms 38 carry a spring biased detent 48 engageable with incremental depressions 49 in the plate corresponding to the aforementioned proximity requirements (1-5).

In accordance with this invention the flexible gas connector H is provided to conduct gas to the moveable burners B2, and to this end comprises a flexible hose 55 coupled between the manifold M2 and the output connection of a gas supply valve 56. Flexible hose for the service involved is metallic with limited flexibility, such as for example a bellows type hose with a protective brade, simple bending thereof being feasible. Accordingly, the hose 55 is rolled or turned into a simple 180° loop X with opposite ends Y and Z disposed in parallel relation and in a plane adjacent one side panel 11 of the cabinet C. As shown, the manifold M2 and valve 56 are coaxially coupled to the ends Y and Z respectively, as by means of threaded unions 58 or the like, and to the end that the end Y is free to move with the elevator-drawer A while the end Z remains stationary with the supply valve 56. In practice, the supply valve 56 at the stationary end Z is accessible at a front panel of the base of the cabinet C, while the moveable manifold end Y is coupled through a thermostat control 57 carried by and accessible at the front of the shield 31.

A feature of this adjustable broiler is the top heat comprised of the burner B1 and the manifold M1 therefor, there being metallic radiants R of low mass disposed to be heated by the lateral jets of flame emitting from the burners B1. In practice, there is a plurality of parallel burners B1 extending fore and aft and normal to the manifold M1 carried transversely of the cabinet C between the side panels 11. The burners B1 are stationary, having air shutters 60 supported over a nipple 61 projecting from the manifold, and a flange 62 engaged over a pin 63, assuring a horizontal positioning of the gas jets 64 that emanate at opposite sides of the burner tube substantially coextensive therewith. As shown, the radiants R comprise plates of non corrosive steel or the like extending parallel at each side of the burner tube and each in a plane disposed with and above the flame jet from which heat is absorbed. At or near the tip of the flame jet, the radiant R is upturned for rigidity and to direct the flame tip upwardly. Thus, the radiants R are provided in pairs that embrace each manifold tube, there being a yolk 65 joining the opposite ends of the radiants to carry them on the manifold tube and located thereon by pins 66 engaged through said yolks.

From the foregoing it will be seen that I have provided a stove oven for radiant top broiling and bottom griddle broiling, featuring a front opening oven chamber for convection air flow. In practice, the rear edges of the top griddle G1 is spaced substantially forward of the rear panel 10 for venting all hot gases, while the entire front area of the oven chamber is open for induction of clean air over the foods being broiled. As shown, there is ample ventilation around the entire elevator-drawer A and bottom contact griddle G2 for the natural convection flow of air above and below said griddle and rearwardly and upwardly through the chamber and out the flue area. The importance of leveling the stove cabinet C will be apparent when considering the effect of the permanent and controlled dip or pitch of the griddle G2, and all to the end that low heat top and bottom broiling becomes feasible in a convection flow oven that remains open for observation of the cooking process and for facility of loading and unloading the foods therefrom. The various weights of foods are readily compensated for and selected broiling positions maintained with assurance. And, all stove parts and elements are readily accessible and/or removable for cleaning and servicing with facility.

Having described only a typical preferred form and application of my invention, I do not wish to be limited or restricted to the specific details herein set forth, but wish to reserve to myself any modifications or variations that may appear to those skilled in the art.

I claim:

1. An adjustable broiler stove including, a cabinet of panels forming an oven chamber, radiant heat means disposed horizontally within the top of the oven chamber, a food supporting and contacting griddle and underlying heat means moveable within the oven chamber, and elevator means comprised of upper and lower lift arms arranged in trapezium formation swinging from spaced pivots carried by the cabinet and extending to spaced pivots carrying the griddle and heat means, the last mentioned pivots being more closely spaced than the first mentioned pivots whereby the said griddle is increasingly displaced from horizontal as it is raised in selectively positioning the said griddle in spaced relation to said radiant heat means.

2. The adjustable broiler stove as set forth in claim 1 wherein the upper and lower lift arms swing from vertically spaced pivots carried by the cabinet and extend to vertically spaced pivots carrying the griddle.

3. The adjustable broiler stove as set forth in claim 1 wherein the upper and lower lift arms swing from spaced transversely disposed pivots carried at the rear of the cabinet and extend forwardly to spaced transversely disposed pivots carrying the griddle.

4. The adjustable broiler stove as set forth in claim 1 wherein the upper and lower lift arms swing from vertically spaced transversely disposed pivots carried at the rear of the cabinet and extend forwardly to vertically spaced transversely diposed pivots carrying the griddle.

5. An adjustable broiler stove including, a cabinet of back and side panels forming a front opening oven chamber, radiant heat means disposed horizontally within the top of the oven chamber, a food supporting and contacting griddle and underlying bottom heat means moveable into and within the oven chamber, and elevator-drawer means carrying said griddle and bottom heat means and selectively entering and positioning the said griddle and bottom heat means in the oven chamber and in spaced relation to said radiant heat means, the elevator-drawer means comprising a carriage underlying a rear position of the griddle and bottom heat means at the back of the cabinet and moveable on tracks extending from the back of the cabinet to the front opening thereof, and upper and lower lift arms arranged in trapezium formation swinging from spaced transversely disposed pivots carried by the carriage and extending forwardly to spaced transversely disposed pivots carrying the griddle and bottom heat means, the last mentioned pivots being more closely spaced than the first mentioned pivots whereby the said griddle is increasingly displaced from horizontal as it is raised.

6. The adjustable broiler stove as set forth in claim 5, wherein both the transversely disposed pivots carried by the carriage and carrying the griddle and bottom heat means are vertically spaced.

* * * * *